United States Patent [19]

Dube et al.

[11] Patent Number: 4,960,460
[45] Date of Patent: Oct. 2, 1990

[54] RECOVERY OF NON-FERROUS METALS FROM DROSS USING PLASMA TORCH

[75] Inventors: Ghyslain Dube; Jean-Paul Huni; Serge Lavoie; Wesley D. Stevens, all of Jonquiere, Canada

[73] Assignee: Alcan International Limited, Montreal, Canada

[21] Appl. No.: 457,521

[22] Filed: Dec. 27, 1989

Related U.S. Application Data

[63] Continuation of Ser. No. 286,386, Dec. 19, 1988, Continuation-in-part of Ser. No. 255,060, Oct. 7, 1988.

[30] Foreign Application Priority Data

Dec. 22, 1987 [CA] Canada .................................. 555114
Oct. 7, 1988 [CA] Canada .................................. 579628

[51] Int. Cl.$^5$ .............................................. C22B 4/02
[52] U.S. Cl. .................... 75/10.19; 75/10.21
[58] Field of Search ............... 75/10.19, 10.21, 68 R, 75/93 R, 93 AC; 373/20, 22

[56] References Cited

U.S. PATENT DOCUMENTS

| | | | |
|---|---|---|---|
| 1,917,856 | 7/1933 | Schmeller, Sr. | 266/901 |
| 2,768,075 | 10/1956 | Sterental | 75/68 R |
| 3,043,678 | 7/1962 | Lowry et al. | 75/68 R |
| 3,403,211 | 9/1968 | Foex | 373/20 |
| 4,877,448 | 10/1989 | Lindsay | 75/10.21 |

FOREIGN PATENT DOCUMENTS 778913 2/1972 Belgium .

Primary Examiner—Melvyn J. Andrews
Attorney, Agent, or Firm—Cooper & Dunham

[57] ABSTRACT

A method and apparatus for treating non-ferrous metal drosses in order to recover the free metal contained therein. The dross is heated by a plasma torch in a rotary furnace, preferably to a temperature above 800° C. The plasma heating and rotary motion make it possible to recover metal from the dross without employing the conventional salt bath. This means that the gases exiting the furnace can be treated more easily to remove pollutants and the soild residues can be discarded without risk of causing environmental pollution. By controlling the speed of rotation of the furnace, large dross lumps can be accommodated and so the conventional grinding and screening procedure of the dross can advantageously be eliminated.

15 Claims, 3 Drawing Sheets

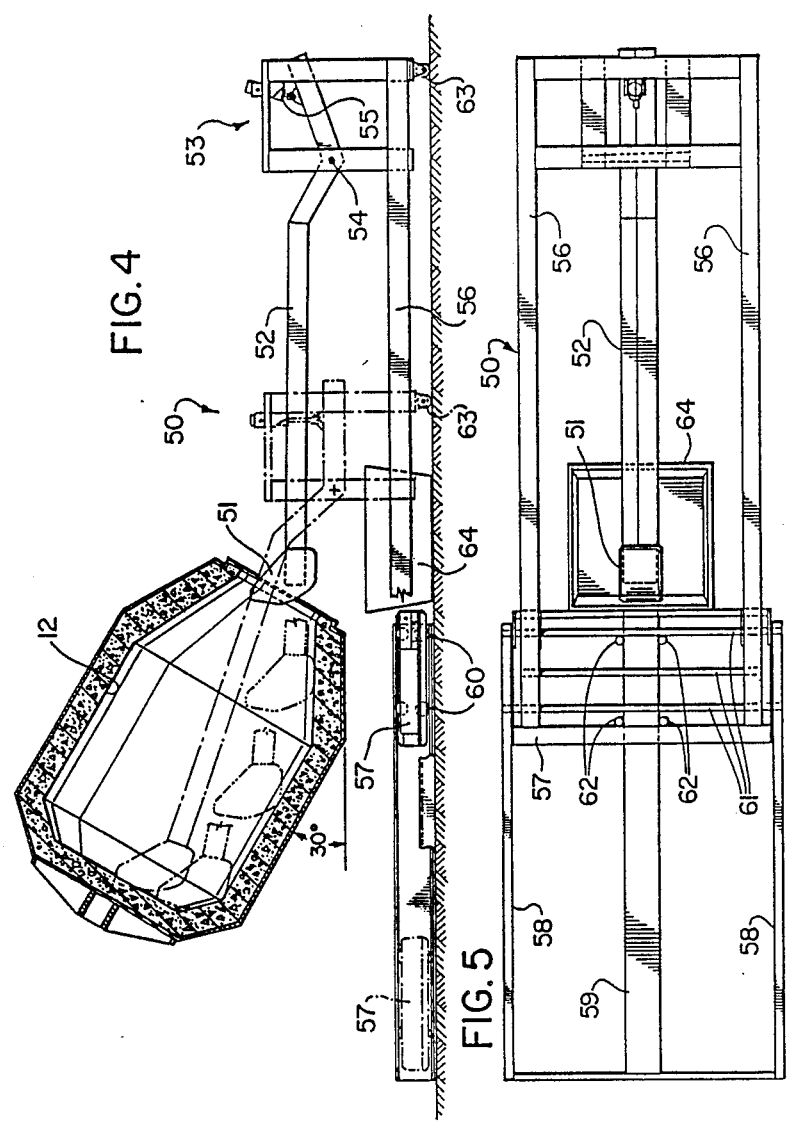

RECOVERY OF NON-FERROUS METALS FROM DROSS USING PLASMA TORCH

This is a continuation of application Ser. No. 286,386, pending, filed Dec. 19, 1988, which is a continuation-in-part of application Ser. No. 255,060, filed Oct. 7, 1988, pending.

BACKGROUND OF THE INVENTION

I. FIELD OF THE INVENTION

This invention relates to the recovery of non-ferrous metals, particularly aluminum, from dross.

II. DESCRIPTION OF THE PRIOR ART

Dross is a material which forms on the surface of molten non-ferrous metal during remelting and metal holding and handling operations when the molten metal is in contact with a reactive atmosphere. Dross normally consists of metal oxides entraining a considerable quantity of molten free (unreacted) metal, and for economic reasons it is desirable to extract the free metal before discarding the residue.

The traditional processes for recovering the free metal generally involve one or several of the following steps:

1. Cooling of the dross using either a mechanical cooler or a dross room (where the dross is spread out over a floor). Some metal recovery may take place at this stage by drainage of the metal from the dross, possibly assisted by mechanical agitation.

2. Transportation of the cooled dross to a dross treatment plant.

3. Crushing and screening of the cooled dross, followed by elimination (usually by dumping) of the fine fraction which consists mainly of oxides and which may be dangerous and disadvantageous to handle in subsequent steps.

4. Heating of the larger dross fractions in the presence of a molten salt bath in order to remelt the metallic fraction and cause the molten droplets to coalesce.

Step 4 is normally carried out in a rotary furnace. The dross fractions and salt mixture (normally a 50:50 mixture of NaCl and KCl to which a small quantity of fluoride salt is optionally added in order to lower the melting point of the salts and to increase the wettability of the solid oxides) are charged and heated to a temperature above the melting point of the metal using direct flame burners. The furnace is then rotated at a suitable rate of speed to obtain a tumbling or cascading action of the mixture.

While salt bath furnaces are acceptably efficient and high metal recoveries can be obtained, they have serious disadvantages, including those listed below:

(i) Salt fumes generated by the molten salt (which can be copious if a burner is directed onto the salt bath) are very corrosive both within the plant and to the external environment. Elaborate and expensive exhaust gas collection and cooling equipment and dust collection systems are required.

(ii) The residual salt cake with dross impurities is very polluting because the salts are water soluble and are readily leached out of dump sites. They must therefore be dumped only in specially prepared land-fills, which is a severe problem because of the large quantities produced (approximately two parts by weight of residue are generated for each part by weight of recovered metal).

(iii) Salt bath furnaces are thermally inefficient because
  (a) a fossil fuel heating system is employed for which heat recuperation is impossible due to the corrosive nature of the exhaust gases;
  (b) approximately one part by weight of salt must be melted for each two parts by weight of dross.

Step 3 also gives rise to disposal problems because the dross fines are also rather toxic and difficult to handle.

Processes have recently been proposed to avoid these problems. For example, it has been proposed to extract the liquid metal from dross by mechanical compression of the hot dross removed directly from a furnace. This process requires expensive equipment and high dross temperatures and is limited by these and other factors to relatively large scale operations. Moreover, this approach does not directly address the disposal problems because the residues still contain a large quantity of free metal.

It has also been proposed (in the case of aluminum dross) to induce and maintain burning or thermitting of the dross under controlled conditions by working the dross in an inclined rotary barrel open to the atmosphere, thus permitting a certain portion of the metal content to be consumed in order to recover the remainder. This method has the drawback of being technically complicated to operate and of producing voluminous polluting fumes. In a modified version of this process, the barrel is closed and aluminum chloride vapour is introduced in order to control oxidation. However, the problems of safety and fume control that arise when the barrel is opened are even more acute than those arising from the original process.

There is consequently a need for a more acceptable way of recovering non-ferrous metals from dross that avoids the safety and pollution concerns and can be operated relatively economically.

OBJECTION OF THE INVENTION

It is therefore an object of the present invention to provide an improved process and apparatus for recovering non-ferrous metals, and particularly aluminum, from drosses containing such metals.

SUMMARY OF THE INVENTION

According to one aspect of the invention, there is provided a process for recovering a non-ferrous metal from a dross containing the same, which comprises: introducing the dross into a rotary furnace; heating the dross to a temperature above the melting point of the metal by directing a plasma torch into the furnace; rotating the furnace either continuously or intermittently; removing the molten metal thereby separated from a solid dross residue; and removing said solid dross residue from the furnace.

The dross is preferably heated to a temperature above 800° C. Such high temperatures can be easily and quickly obtained by means of the plasma torch.

According to another aspect of the invention there is provided an apparatus suitable for recovering a non-ferrous metal from a dross containing the same, the apparatus comprising: a rotary furnace including a closable generally cylindrical rotatable chamber; a plasma torch capable of being directed into the interior of said chamber; means for removing a liquid metal from said chamber; and means for removing a solid dross residue from said chamber.

According to yet another aspect of the invention there is provided a scraper device for a rotary furnace having a refractory lining and containing a solid residue, comprising a scraper tool suitable for introduction into the furnace and for scraping at least some of said solid residue from said lining when the furnace is rotated;

a support shaft for said scraper tool of sufficient length to allow the scraper tool to be fully inserted into said furnace;

means for supporting and pivoting said shaft to permit raising and lowering of said scraper tool; and means for guiding said support shaft to permit forwards and rearwards motion while resisting lateral motion thereof.

BRIEF DESCRIPTION OF THE DRAWINGS

FIG. 4 is a side elevation of a preferred scraper mechanism also showing the rotary chamber of a furnace in cross-section; and FIG. 5 is a plan view of the mechanism of FIG. 4 with the rotary chamber omitted.

DETAILED DESCRIPTION OF THE PREFERRED EMBODIMENT

Figure 1:
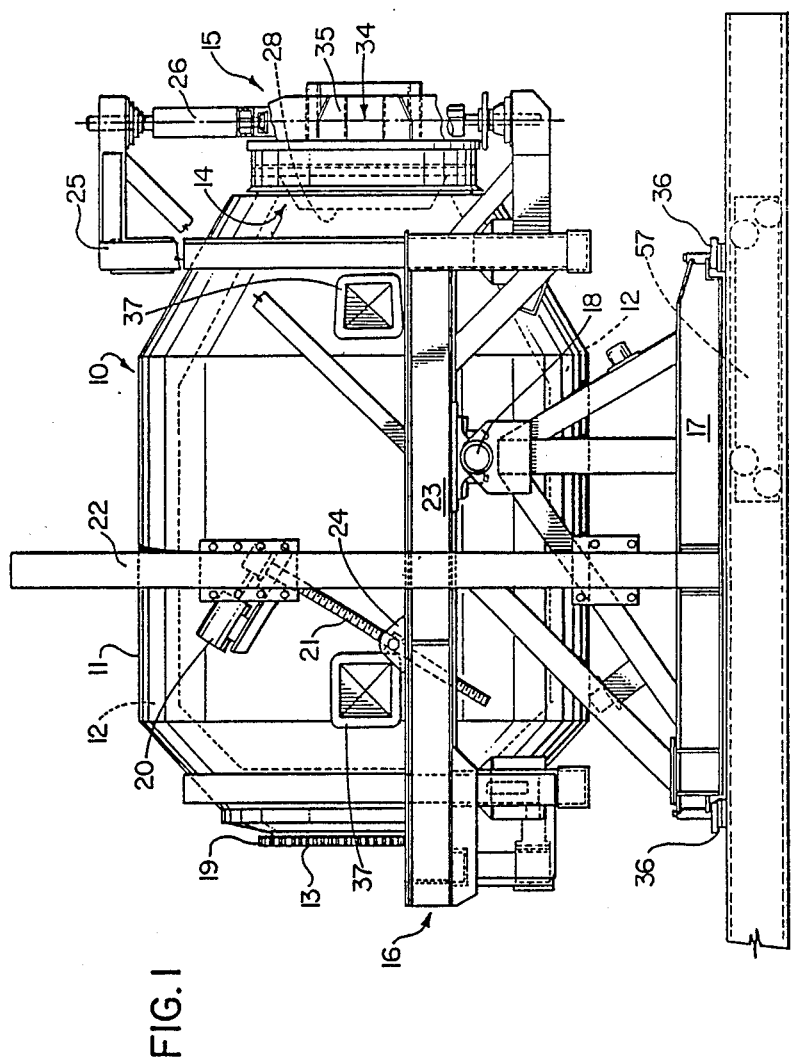
FIG. 1 is a side elevational view of a rotary furnace (except that the plasma torch has been omitted) according to a preferred embodiment of the present invention.

The present invention is normally concerned with the treatment of dross following its initial cooling and is intended mainly as an improvement of step 4 mentioned above. However, the present invention (at least in its preferred forms), has the significant additional advantage that it eliminates the need for step 3 above and can therefore overcome or alleviate the safety and pollution problems arising from both of steps 3 and 4. Since the equipment can be made quite small and relatively inexpensive, the need for a central or remote dross treatment plant may be avoided and so it may also be possible to eliminate step 2 above and to recover metal from the dross in the immediate vicinity of a casting house or metal handling plant.

By the term "rotary furnace" we mean a furnace having a generally cylindrical chamber lined with a suitable refractory material and heated from within. The chamber can be mounted with its axis generally horizontal, although there may be a mechanism for tilting the furnace about a transverse axis when desired. The chamber should preferably be closable, which means that the external atmosphere can be excluded, although of course there must be sufficient venting (usually at one or other end of the furnace) to allow for the escape of gases introduced into the furnace by the plasma torch and given off by the dross charge. One or both ends of the chamber may be equipped with a closable door to permit charging of the furnace and contents removal. If both ends of the furnace are not equipped with such doors, then one end normally has a permanent end wall and the other end has a closable door. The furnace also has a mechanism for rotating the chamber about its longitudinal axis and this most desirably incorporates means for controlling the speed and/or direction of rotation. The rotary furnace is normally operable on a batchwise basis as distinct from a rotary calciner or kiln for minerals or the like which generally is of much greater length (e.g. aspect ratios of 10–50:1) and can be operated continuously.

The refractory lining for a rotary furnace heated with a plasma torch should normally be capable of resisting higher temperatures (i.e. temperatures above 800° C.) than linings used for furnaces heated by conventional burners. For example, it may be desirable to use a high alumina castable rather than a low alumina firebrick.

By the term "plasma torch" we mean a plasma generator capable of directing a stream of gaseous plasma at extremely high temperature (often up to about 8000° C.) for a considerable distance in a desired direction. Plasma torches generally consist of an elongated tube through which a gas passes with one or more electrodes positioned within the tube to generate an electric arc within the gas. Plasma torches of the contained arc type are much preferred for use in the present invention, although in certain circumstances it may be possible to use transferred arc type plasma generators. Plasma torches of various heating powers are commercially available, e.g. from Plasma Energy Corporation, USA. Torches ranging in output from about 100 KW to 2.5 MW are currently available and a plasma torch of suitable output can readily be found to match furnaces of different charge capacities.

The plasma torch is preferably tiltably mounted within the rotary furnace. This allows the plasma to be directed away from the dross charge during initial heating and tumbling (to prevent the formation of hot spots). For example, if the plasma torch is directed upwardly by about 15° from the horizontal, the heat is directed onto the furnace lining and is conveyed into the dross charge by conduction as the furnace rotates. The plasma torch should preferably not be directed along the axis of the furnace as this produces a hot spot in the lining at the far end wall of the furnace. Once the metal has been tapped off, however, it may be desirable to direct the plasma torch directly onto the dross residue to calcine it or otherwise improve its properties.

A variety of gases can be passed through the plasma torch and examples include $N_2$, $H_2$, CO, $CO_2$, air, Ar and $CH_4$ as well as mixtures of these gases. Diatomic gases are preferable to monoatomic gases because the energy transfer rate is much higher when diatomic gases are used. Since nitrogen is both diatomic and relatively inexpensive, it is the preferred gas in most cases although $N_2/H_2$ mixtures are also often used. However, as will be explained more fully later, different gases may be used at different stages of the process of the present invention.

The metal drosses which can be treated by the inventive process include all non-ferrous metal drosses conventionally recoverable by the salt bath technique mentioned above, and particularly drosses of metals having melting points below about 1200° C. The process is particularly suitable for treating drosses of aluminum, aluminum alloys (e.g. aluminum-magnesium alloys), copper and copper alloys (e.g. copper-tin alloys).

One of the most important features of the process of the invention is that it eliminates the need for the use of a salt bath during the treatment of the dross, and this avoids the serious pollution problems caused by the generation of salt fumes and by dumping water-leachable salts in land fill sites. Moreover, since the dross residue remains solid, it is easily separable from the recovered molten metal, e.g. by tapping off the molten metal through a tap hole or by tilting the furnace down at one end and pouring the molten metal through an end door opening.

Without wishing to be bound to a particular theory, it is believed that the requirement for the use of a salt bath is eliminated in the present invention for the following reasons. The use of a plasma torch for heating the dross, rather than a burner employing a fossil fuel, permits the composition of the atmosphere in the chamber of the rotary furnace to be controlled. A plasma torch can be operated with gas mixtures which are much less reactive than the conventional products of combustion generated by fossil-fuel type burners. This prevents thickening of the oxide coating on the free metal particles or droplets as the dross is being treated. This appears to make the metal droplets more likely to coalesce when they collide during tumbling of the dross. In contrast, water vapour and $CO_2$ produced by fossil fuel burners may thicken the oxide coating or "bag" surrounding each metal droplet. Since the furnace chamber is closable, air and water vapour from the external atmosphere can be excluded, if desired, at least during the metal coalescence stages. The plasma introduces a continuous stream of gas into the inside of the rotary furnace and this generates a slight positive pressure which also helps to keep out the external atmosphere.

Another important feature of the present invention is that the plasma torch generates a much smaller quantity of exhaust gases in the furnace than the conventional salt bath process in which fossil fuels produce large volumes of combustion gases and the salt bath produces clouds of vapour. The small amount of exhaust gas does not require the use of elaborate cooling and treatment equipment and the gas can merely be diluted with air and passed through a standard filtration system. Moreover, the fact that the plasma has such a high temperature means that the dross charge can be heated quickly and a large quantity of heat can be introduced into the furnace by a relatively small quantity of gas.

While the presence of salt fluxes is avoided in the present invention, a variety of reactive chemicals may be added to the furnace in order to control the chemical compositions of the residues. Any such chemical should desirably not be easily vaporizable nor toxic or leachable when the dross residue is discarded, nor of such a nature that it makes the dross residue liquid or otherwise unsatisfactory. The chemical should therefore preferably have a high melting point and a low vapour pressure, and be capable of reacting in the solid/solid state. In the case of aluminum dross, one or more basic compounds such as one or more oxides of calcium, magnesium, boron or silicon, or carbonates of calcium or magnesium may be added to the dross charge in order to tie-up any water-soluble fluoride compounds which may be present in the dross, e.g. as a result of carry over of cryolite and other fluoride compounds (sodium fluoride or aluminum fluoride) in dross removed from holding furnaces receiving aluminum metal directly from reduction cells. The presence of such fluorides in the dross poses environmental hazards and the aforementioned added basic compounds convert them to more stable and environmentally acceptable fluorides.

During the treatment of the dross, the furnace can be rotated at any suitable speed. The speed should desirably be slow enough to avoid substantial damage to the furnace lining by impact shocks from the dross change and the generation of fine particles or dust by abrasion, but fast enough to produce uniform heating of the dross charge and coalescence of the metal droplets. The following procedure for rotating the furnace is highly desirable.

After the dross has first been charged to the furnace, the plasma torch is operated and the furnace is rotated very slowly and preferably intermittently. The important consideration at this stage is that the rotation should not be so fast that damage to the furnace lining is caused by impact from large dross lumps and large quantities of dust are formed by abrasion of the dross particles, but care should be taken to avoid the formation of hot spots in the lining or dross charge (which is a poor conductor of heat). Normally, the rotation is no faster than 1 rpm and is preferably much slower, for example, the furnace may be rotated through 90° over a period of about 15 seconds, allowed to stand for several seconds, then rotated again through 90° (either in the same direction or the reverse direction) over another period of 15 seconds. This procedure is continued until the dross charge reaches a temperature above the melting point of the metal (but below the melting point of the dross residue, usually the metal oxide).

When the dross charge has reached the desired temperature, the heat output of the plasma torch can be reduced since only enough heat to keep the charge at the desired temperature (preferably above 800° C.) is required at this stage. The plasma torch can alternatively be turned off (although the gas flow is preferably maintained) and periodically re-started. The speed of rotation of the furnace is then increased preferably to the range of 1-10 rpm. Relatively rapid rotation is required in order to cause the free metal droplets to impact with each other and coalesce and higher rotational speeds can be tolerated in this stage because there is less risk of damage to the furnace lining and less likelihood of dust formation since large particles have by then been broken up and the dross residue often becomes slightly sticky. On the other hand, rotation should not be so fast that coalescence of the metal droplets is impaired rather than assisted. In this stage, the rotation may be continuous or intermittent, but is normally continuous.

After a suitable amount of time, the rotation is terminated and the recovered metal is tapped off. The dross residue can then be removed from the furnace or it can be subjected to a further treatment in the rotary furnace. For example, the plasma torch or other heating means may be used to calcine the dross residue and, in certain cases, grinding media (e.g. steel balls) may be added to grind the dross residue to a predetermined degree of fineness. The speed of rotation during this stage can be varied widely as desired but should not be so rapid as to cause damage to the furnace, particularly when grinding media are present. Generally, the rotational speed is 1-20 rpm. During this final stage, any heating that may be required can be brought about by the use of conventional heaters, e.g. fossil fuel burners, because the solid dross residues cannot usually be harmed by this. Plasma heating is still preferred, however, because of its rapid heating effect and high temperatures.

Following the final treatment, the dross residue is removed from the furnace. This cannot usually be achieved simply by tilting the furnace and allowing the residue to pour out because the residue usually has poor flow characteristics and may even adhere to the furnace lining. It is therefore usually necessary to introduce a scraper tool into the furnace. The scraper tool may be an upright plate or other device fixed to the end of an elongated shaft having a support and guide mechanism. While the furnace is being slowly rotated (preferably in a downwardly tilted position) the scraper is introduced into the entrance of the furnace chamber adjacent to the inner furnace wall, and is slowly pushed to the opposite end of the furnace and then reversed. This procedure can be repeated as many times as is necessary. The scraper should preferably be guided in such a way that it follows the profile of the chamber to avoid damage to the furnace lining. Although the scraper may gently touch the furnace lining to remove as much residue as possible, in some cases it may be desirable to hold the scraper a short distance away from the lining so that a protective layer of residue is left as a coating on the furnace lining. When the scraper tool is in the form of an upright plate or blade, it may be held at an angle to the longitudinal shaft axis so that the blade tends to scoop the residue out of the furnace as it is reversed back towards the furnace entrance.

Once the furnace has been cleaned of dross residue, another fresh dross charge is preferably added immediately before the furnace cools down so that there is a minimum amount of energy wastage.

As noted above, the atmosphere in the furnace chamber preferably does not include certain gases (e.g. water vapour) during the treatment of the dross charge. However, such a gas may be present if desired during the final dross residue treatment after the metal has been tapped off. Moreover, different gases may be used at different stages of the dross treatment. This can best be illustrated by reference to the treatment of aluminum dross, as follows.

Molten aluminum metal reacts at high temperature (above 850° C. and especially above 1000° C.) with gaseous nitrogen to form aluminum nitride which is an undesirable product because it slowly reacts with water when discarded to produce ammonia and is thus environmentally unacceptable. However, nitrogen is the preferred gas for use in a plasma torch because of its high heat capacity and relative cheapness. Consequently, nitrogen plasma may be used for the initial heating of the dross charge. The facts that the metal is mostly solid at this stage, the reactivity of the metal with nitrogen is low at lower temperatures, the plasma heats the charge rapidly and the slow rotation exposes relatively little surface area means that large quantities of nitride are not formed. Once the charge has reached its maximum temperature, argon (or other non-reactive gas) can then be used as the furnace atmosphere to prevent any oxidation or reaction of metal and permit efficient metal agglomeration by furnace rotation. The argon is introduced into the furnace through the torch with zero or minimum applied electric power. However, if the formation of nitrides is acceptable or if the rotation is such that they do not form excessively, nitrogen may be a used at the later treatment stages.

Examples of gases which may be used at different stages of aluminum dross treatment are shown in the following table:

TABLE

| PROCESS STEPS | OPTIONS | | | | | |
|---|---|---|---|---|---|---|
| | 1 | 2 | 3 | 4 | 5 | 6 |
| Plasma Gas Used At Start of Heating (from 20° C.) | AIR | AIR | AIR | AIR | AIR/$N_2$ | AIR/$N_2$ |
| Plasma Gas Used At The Temperature the Aluminum Becomes Molten (660° C.) | $N_2$ | AIR | $N_2$ | AIR | AIR/$N_2$ | AIR/$N_2$ |
| Plasma Gas Used For Heating Dross to Temperatures of Around 850° C. | $N_2$ | AIR | Ar | AIR | AIR/$N_2$ | AIR/$N_2$ |
| Furnace Atmosphere Suitable for Processing Dross Within Range 850-1000° C.* | Ar | Ar | Ar | — | — | Ar |

*Argon is preferred for processing the dross to temperatures significantly higher than about 850° C. The bulk of the dross tends to increase in (average) temperature to this level without applied power (because some parts of the dross are heated to much higher temperatures) and so the plasma is normally turned off while the argon is introduced into the furnace through the torch.

Thus, air or nitrogen can be used alone or mixed in the early treatment stages, and can optionally be followed by argon.

Following removal of the recovered metal, it may then be desirable to introduce a reactive gas into the chamber, either via the plasma torch (or through conventional heating means) or directly into the chamber (e.g. by opening a closable door). It may also be desirable to increase the temperature of the dross residue. For example, the temperature can be raised above 1000° C. and water vapour may be introduced to destroy any aluminum nitride formed (conversion to alumina is very rapid at temperatures above 1000° C), or oxygen, air or other oxygen-containing gas may be introduced to convert any free metal to alumina. For instance, in the presence of alkaline compounds such as calcium and magnesium oxides (e.g. calcined dolomite), a mixture of air and steam is an effective and inexpensive technique to fully oxidise the residue, eliminate nitrides and stabilise the fluoride residue. Nitrogen in the nitride is evolved as gaseous ammonia. The fluorine content of the fluorides is converted to insoluble calcium and magnesium fluorides.

It should be noted that the present invention is particularly suitable for treating dross cooled by the method and apparatus disclosed in our European patent application serial No. 86 308490.1 filed on Oct. 30, 1986 and published under publication No. 0 224 343 on June 3, 1987. This prior invention cools dross rapidly and safely while minimizing polluting emissions and avoiding the release of dross fines. Some free metal may be drained from the dross and recovered during this stage. The resulting cooled dross, however, is produced in the form of large lumps or bricks which may damage a conventional rotary furnace rotated at the usual speed of 5 to 10 rpm. The slow initial rotation preferred in the present invention prevents the large dross lumps from causing impact damage to the furnace lining.

When the present invention is carried out in conjunction with our prior invention, an especially effective way of handling and treating dross is produced that (a) avoids pollution by gaseous emissions from the hot dross, (b) cools the dross rapidly, (c) avoids the formation of harmful fines, (d) recovers metal values from the dross in an efficient and environmentally safe manner, and (e) has the potential of treating the dross residue to convert it to a useful product (e.g. a powder suitable for asphalt filler, as an additive to refractories, production of fiber-glass mineral wool or the like).

The process of the present invention is amenable to computer control. For example, a computer can calculate the times required for each of the treatment steps based on the weight of the dross charge and can determine optimum rotational speeds based on the heat distribution within the dross charge. For example, by monitoring the temperature of the exhaust gases during the initial heating stage, it can be determined whether the speed of rotation should be increased. Excessively hot exhaust gases indicate that the rotational speed should be increased so that the charge absorbs more heat. The maximum desired temperature of the exhaust gases may be 500° C. at the outset of the heating stage, but may increase to 1200° C. as heating proceeds. All of this can be controlled by a suitable computer program.

The preferred embodiments of the invention are described in further detail below with reference to the accompanying drawings.

Figure 2:
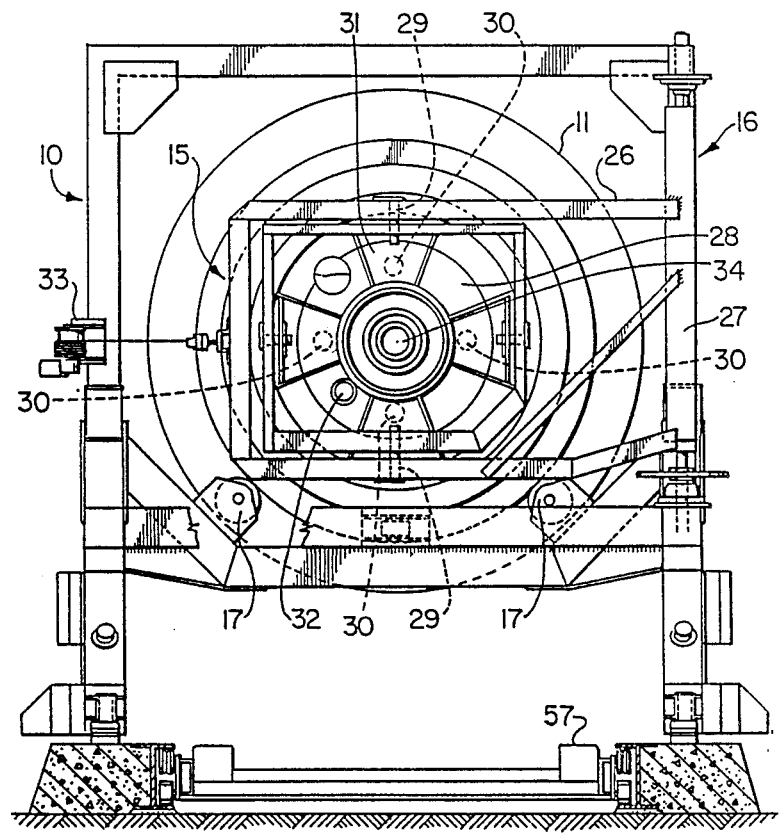
FIG. 2 is an end elevational view of the furnace of FIG. 1.

A furnace 10 in accordance with the present invention (except lacking a plasma torch) is shown in side view in FIG. 1 and in end elevation in FIG. 2. The furnace consists of a hollow steel cylinder 11 having its interior walls lined with a high temperature-resistant refractory layer 12. The walls of the cylinder taper inwardly at each longitudinal end and one end is closed by an end wall 13 while the other end has an opening 14 which is closable by a door mechanism shown generally at 15. The above structure forms an enclosed furnace chamber for treatment of the dross.

The cylinder 11 is rotatably and tiltably supported by a framework 16. The framework allows the cylinder to rotate on its longitudinal axis on rollers 17 and also permits it to tilt about pivots 18. The rotation is effected by a gear ring 19 rigidly connected to the cylinder and a chain (not shown) which passes around the gear ring and is driven by a motor (not shown) capable of rotating the cylinder either intermittently or continuously in either direction at speeds up to about 10 r.p.m. or even as high as 20 r.p.m. Tilting is effected by a motor 20 which rotates a threaded rod 21 connected between an upright gantry member 22 and a horizontal cradle member 23 via a threaded bracket 24. Rotation of the rod causes tilting of the cylinder 11 in either direction about pivot 18 preferably to an extent ranging up to about 30° above or below the horizontal.

The door mechanism 15 is supported by a framework 25 rigidly attached to the tiltable section of the main framework 16. The framework 25 comprises a door mount 26 vertically hinged at one side via a rotatable vertical shaft 27. A circular refractory lined door 28 is supported on the framework 25 by vertical pivots 29 which allow the door to tilt relative to the framework 25 so that the door can seat properly in the opening 14 in the cylinder 11. The door has four horizontal holes 30 which act as gas vents to permit escape of furnace gases to the exterior. The vents are covered by an annular channel 31 having an exhaust conduit 32.

The refractory-lined door 28 rotates with the cylinder, the door 28 is attached to the non-rotating framework 25 via a low friction annular bearing rotated under the annular channel 31. Escape of gases between the periphery of the opening 14 and the confronting periphery of the door is prevented by positioning a gasket of fibrous material around the furnace opening between the cylinder 11 and the door 28. The door is held closed by a cable and winch arrangement 33 which pulls the door into sealing contact with the cylinder 11, thus compressing the gasket.

The door 28 has a central hole 34 which receives an annular plasma torch mount 35. The walls defining the hole and the engaging parts of the mount form a ball-and-socket type of joint which permits the torch mount to be tilted relative to the longitudinal axis of the hole 34 (and consequently also relative to the central longitudinal axis of the cylinder 11). When a plasma torch is located in the mount 35, it seals the hole 34 against the release of gases but the mount permits the plasma torch to be tilted as required within the furnace. Generally the mount allows the plasma torch to be tilted by up to 15° either above or below the central longitudinal axis of the furnace.

Figure 3:
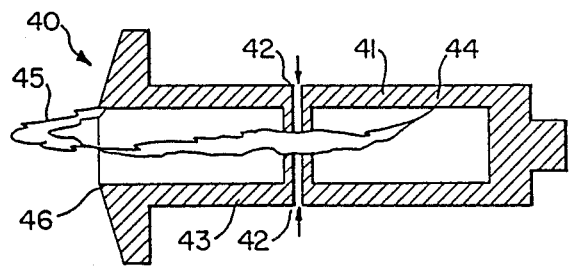
FIG. 3 is a longitudinal cross-section of a plasma torch of the type which may be used in the present invention.

A typical contained arc type of plasma torch 40 for use in the present invention is shown in FIG. 3. The torch comprises an elongated tube 41 having gas injection ports 42 located between front and rear electrodes 43 and 44, respectively. An arc 45 is struck between the front and rear electrodes and the gas is converted to plasma and ejected from nozzle 46. The plasma torch normally has a water jacket (not shown) to avoid overheating. The torch can be mounted in the furnace in the manner indicated above with the nozzle 46 projecting into the furnace.

FIGS. 4 and 5 illustrate a mechanical scraper 50 for use with the furnace of FIGS. 1 and 2. The scraper has a scraper tool 51, preferably made of cast iron, steel or the like with a tungsten carbide or other wear-resistant scraping edge, mounted at the free end of an elongated shaft 52. The opposite end of the shaft 52 is pivotally supported by a frame 53. The shaft is pivoted at a pivot point 54 spaced a distance from the extreme end of the shaft and a hydraulic piston 55 acts on the shaft at a point close to the extreme end. When the piston moves the extreme end of the shaft downwardly, the shaft pivots about point 54 from the generally horizontal rest position and the scraper tool 51 is raised.

The frame 53 is mounted on elongated horizontal side beams 56, the front ends of which can be rigidly attached to a guiding device or carriage 57 (shown also in FIGS. 1 and 2). The carriage is designed to move along a track extending beneath the rotary furnace and its function is to guide the scraper into the furnace and to provide rigid lateral support for the front end of the scraper mechanism. The track extending beneath the furnace is best shown in FIG. 5 and consists of a pair of parallel guide rails 58, 58 and a massive central support rail 59. The carriage has a number of wheels 60 at each side capable of riding along rails 58, 58. The wheels 60 are supported on shafts 61 extending across the carriage. The carriage also has a number of vertical rollers 62 which engage opposite vertical faces of the support rail 59 and provide good lateral support for the carriage.

The carriage may contain a stall motor (not shown) for self-propulsion along the track but this is not essential because the scraper mechanism may be pushed forwards and backwards by other means. When the carriage is self-propelled, however, the rails 58, 58 may be provided with horizontal gear teeth and the driven wheels 60 may be in the form of sprockets engaging the gear teeth.

The side beams 56 are mounted on small idle rollers 63 which may also ride on a track but anyway resist sideways displacement of the scraper mechanism.

A crucible 64 is positioned at the open mouth of the furnace and the size of the crucible is such that it does not impede forwards and backwards movement of the scraper mechanism.

The apparatus described above is operated in the following manner.

The furnace 10 is pre-heated either by means of a conventional heating device (e.g. a gas burner or an electric element) or by means of the plasma torch 40.

A dross charge is then prepared in a charging device (not shown) such as a shovel mounted on a fork-lift truck and specially adapted to fit within the furnace opening 14. The door 28 is then opened and the furnace is tilted to the horizontal position by tilting motor 20. The furnace is charged with dross until the charge occupies about one quarter to one third of the total interior volume of the furnace. The weight of the load can be measured by means of four load cells 36 (FIG. 1).

The gasket of fibrous material is then installed around the furnace opening 14 and the door 28 is then closed and winch 33 operated to hold the door tightly closed.

The furnace is then tilted upwardly (door end high) by up to 30°. A higher tilting angle allows a larger dross charge to be handled because the molten metal, when formed, must not rise to the level of the door opening 14. However, the tilting angle should not be so high that a tumbling effect is prevented.

The initial plasma heating is carried out with the plasma torch 40 angled upwardly from the horizontal, i.e. away from the dross charge. This ensures that no hot spots are formed in the dross. As the plasma torch is operated, the furnace is rotated at a continuous, or preferably intermittent, speed of less than 1 r.p.m. The rotation prevents a hot spot forming in the furnace lining 12 and also conveys the heat to the dross charge. The temperature of the dross charge is monitored either by thermocouples (not shown) buried in the furnace lining 12 and/or by means of a thermocouple mounted in the gas exhaust conduit 32. A high exhaust gas temperature indicates that the charge is ready or that the refractory layer is being overheated and that damage may result. A computer may be used to enable the speed of rotation of the furnace to be varied according to the temperature of the exhaust gas.

When the charge has been uniformly heated to a temperature above the melting point of the metal in the dross (and preferably above 800° C.), the plasma output may be cut back or turned off (and optionally the plasma gas changed) and the speed of rotation of the furnace is increased until most of the metal has coalesced and separated from the solid dross residue. The rotation is then stopped and the molten metal is removed through one or more tap holes 37. The tilting and rotating capabilities of the furnace can be used to direct the molten metal towards one or other of the tap holes. The molten metal is poured into a drain pan (not shown) located under the furnace. The non-metallic impurities included in the dross remain in the furnace as a solid, and are usually adhered to the walls of the furnace.

The solid impurities may be subjected to further treatment, if desired (e.g. a heat treatment using the plasma torch or a conventional heater), and then the furnace is opened and the cleaning mechanism is operated to clean out the furnace. To achieve this, the door 28 is first opened and the furnace is tilted downwardly preferably by about 30°. The crucible 64 is positioned at the mouth of the furnace, the carriage 57 is moved beneath the front of the furnace and the side beams 56 of the scraper mechanism are attached. The furnace is rotated (5 to 10 r.p.m.) and the scraper mechanism moved so that the scraper tool enters the furnace opening. The piston 55 is operated so that the blade follows the contour of the furnace lining 12 so as not to cause damage to the lining. The tool is shaped in the manner shown so that every part of the lining can be reached. The rotation of the furnace coupled with the forward and backward movement of the scraper tool causes the solid dross residue to fall into the crucible 64. The scraper tool is moved forwardly and rearwardly until all of the dross residue has been removed.

FIG. 4 shows, in broken lines, various positions of the scraper blade 51 during its forward and rearward motions and also shows the extreme front and rear positions of the scraper mechanism and carriage 57.

The scraper tool is then removed from the furnace, the scraper mechanism is detached from the carriage and the carriage is retracted under the furnace.

The invention is further illustrated by the following Examples.

EXAMPLE 1

A charge of aluminum dross sample of mixed alloys origin weighing 394 kg was charged in a refractory-lined tilting and rotating cylindrical preheated furnace.

A 150 kW nitrogen plasma-arc torch, installed in the cover of the furnace, supplied heating for about 100 minutes. The furnace was intermittently rotated at the beginning of the heating period (about a quarter of a turn every (five minutes) and continuous rotation was begun after about sixty minutes of heating at RPM varying between 5 and 10.

After the heating period, 266 kg of liquid aluminum were drained from the furnace by tilting. The metal temperature varied between 1000 and 1100° C. The analysis of the powdery residue revealed an aluminum content of 2% metallic aluminum, corresponding to 3.5 kg of Al loss. This corresponds to an aluminum extraction efficiency of 266/269.5=98.7%.

EXAMPLE 2

A charge of dross weighing 458 kg of Al-Mn alloy, cooled under an argon atmosphere, was charged in a refractory-lined tilting and rotating cylindrical preheated furnace. The charge was heated with a 150 kW nitrogen plasma-arc torch fixed in the cover of the furnace. The torch was slightly inclined relatively to the rotation axis of the furnace in order to avoid direct impingement on the surface of the dross charge.

At the beginning of the heating period, the furnace was intermittently rotated (about a quarter of a turn every five minutes), and then progressively increased to a continuous rotation speed of about 5–10 RPM when the solid mass began to liquefy.

After about 90 minutes, 273 kg of liquid aluminum were tapped from the furnace by tilting, corresponding to a gross aluminum content of about 60%. The powdery residue, removed by mechanical scraping from the furnace lining, weighed 187 kg and contained 2.3% metal-free aluminum and about 37% aluminum nitride. These results correspond to an extraction efficiency of about 88%, assuming that the original dross samples contained about 4% Al N and that the weight increase of the charge was due to the formation of aluminum nitride. The aluminum nitride content of the residue was later reduced to less than 10% by holding the hot residue in the presence of a moist air atmosphere at a temperature of about 1000° C. using either electric or gas-fired torch.

In both cases, the energy consumption was less than 1 kWh per kilogram of dross; this consumption is less than that of conventional technologies sing fossil-fuel heating source.

EXAMPLE 3

A charge of dusty dross weighing 3009 kg originating from mixed aluminum alloys and which had been cooled under argon atmosphere, was charged in a preheated, cylindrical refractory-lined, rotating and tilting furnace. The charge was heated with a 1 MW air plasma-arc torch positioned in the door of the furnace. The torch was slightly inclined relative to the rotation axis of the furnace in order to avoid direct impingement on the surface of the dross charge.

The furnace was intermittently rotated (about a ⅛ turn every 2 minutes) and tilted at 5° to the horizontal. After about 107 minutes of heating, the torch was turned off and argon was introduced into the furnace. The furnace was rotated continuously for another ten (10) minutes at a speed of about 2 RPM. Then, 826 kg of liquid aluminum were tapped from the furnace through a 2.5 inch diameter tap hole. The furnace was rotated continuously for another ten (10) minutes at a speed of 6 RPM and, 155 kg of liquid aluminum were tapped through the tap hole, to make a total of 981 kg of aluminum, corresponding to an aluminum recovery of 32.6%.

The hot powdery residues, removed by mechanical scraping from the furnace lining, weighed 2111 kg and contained 5.5% free aluminum and about 14.6% of aluminum nitride. The dross as-charged contained 16.3% of aluminum nitride. These results correspond to an extraction efficiency of about 81%, assuming that the weight increase of the charge was due to the formation of aluminum oxide.

The energy consumption was about 1496 KWh/ton of aluminum extracted. With a nitrogen plasma, the energy consumption was 2144 KWh/ton of aluminum extracted. The difference is due to the exothermic oxidation of aluminum nitride present in the dross.

Preferred embodiments of the invention have been described above but various modifications and alterations will readily occur to persons skilled in the art. All such variations and modifications form part of the present invention to the extent that they fall within the scope of the invention as defined by the following claims.

What we claim is:

1. A process for recovering a non-ferrous metal from a dross containing the same, which comprises:
   introducing the dross into a furnace having a refractory lining;
   heating the dross to a temperature above the melting point of the metal by directing a plasma torch into the furnace;
   removing the molten metal thereby separated from a solid dross residue;
   adding a solid chemical capable of reacting with the solid dross residue in the solid/solid state to insolubilize water soluble fluorides in the solid dross residue; and
   removing the solid dross residue from the furnace.

2. A process according to claim 1 wherein said chemical is selected from the group consisting of oxides of Ca, Mg, B and Si.

3. A process according to claim 1 wherein said chemical is selected from the group consisting of carbonates of Ca and Mg.

4. A process according to claim 1 wherein said furnace is heated after the addition of said chemical in order to facilitate said solid/solid reaction.

5. A process according to claim 1 wherein the dross is aluminum dross.

6. A process for recovering a non-ferrous metal from a dross containing the same, which comprises:
   introducing the dross into a furnace having a refractory lining;
   heating the dross to a temperature above the melting point of the metal by directing a plasma torch into the furnace;
   removing the molten metal thereby separated from a solid dross residue;
   introducing a gas into said furnace to react with said solid dross residue; and
   removing the said dross residue from the furnace.

7. A process according to claim 6 wherein said gas is an oxygen-containing gas in order to convert free metal remaining in said solid dross residue to aluminum oxide.

8. A process according to claim 6 wherein said gas comprises water vapour in order to convert aluminum nitride in said solid dross residue to aluminum oxide.

9. A process according to claim 6 wherein said gas contains oxygen and water vapour and wherein a solid chemical selected from the group consisting of oxides of Ca, Mg, B and Si and carbonates of Ca and Mg is added to the furnace prior to introducing said gas.

10. A process according to claim 6 wherein the furnace is heated following the introduction of said gas.

11. A process according to claim 6 wherein said dross is aluminum dross.

12. A process according to claim 1 wherein said dross is heated to said temperature above the melting point of the metal by directing a contained arc plasma torch into said furnace.

13. A process according to claim 1 wherein said dross is heated to said temperature above the melting point of the metal by directing a transferred arc plasma torch into said furnace.

14. A process according to claim 6 wherein said dross is heated to said temperature above the melting point of the metal by directing a contained arc plasma torch into said furnace.

15. A process according to claim 6 wherein said dross is heated to said temperature above the melting point of the metal by directing a transferred arc plasma torch into said furnace.

* * * * *